US012451306B2

(12) United States Patent
Qi et al.

(10) Patent No.: US 12,451,306 B2
(45) Date of Patent: Oct. 21, 2025

(54) SOFA AND SOFA SWITCH

(71) Applicant: MAN WAH INTELLIGENT TECHNOLOGY (HUI ZHOU) CO., LTD., Guangdong (CN)

(72) Inventors: Fayun Qi, Guangdong (CN); Zuochao Peng, Guangdong (CN); Zeming Sun, Guangdong (CN); Dinglue Chen, Guangdong (CN); Zilong Li, Guangdong (CN); Dazhuan Tang, Guangdong (CN)

(73) Assignee: MAN WAH INTELLIGENT TECHNOLOGY (HUI ZHOU) CO., LTD., Huizhou (CN)

( * ) Notice: Subject to any disclaimer, the term of this patent is extended or adjusted under 35 U.S.C. 154(b) by 116 days.

(21) Appl. No.: 18/051,020

(22) Filed: Oct. 31, 2022

(65) Prior Publication Data

US 2023/0078262 A1 Mar. 16, 2023

Related U.S. Application Data

(63) Continuation of application No. PCT/CN2020/078128, filed on Mar. 6, 2020.

(30) Foreign Application Priority Data

Feb. 26, 2020 (CN) ......................... 202010119731.3

(51) Int. Cl.
*H01H 13/14* (2006.01)
*A47C 17/86* (2006.01)

(52) U.S. Cl.
CPC ............. *H01H 13/14* (2013.01); *A47C 17/86* (2013.01)

(58) Field of Classification Search
CPC .......... H01H 13/14; H01H 9/22; H01H 13/02; H01H 13/10; A47C 17/86; A47C 1/0242; A47C 17/04
USPC ................................. 200/341, 520, 344, 345
See application file for complete search history.

(56) References Cited

U.S. PATENT DOCUMENTS 4,376,239 A * 3/1983 Long .................... H01H 13/705 200/330
10,123,621 B2 * 11/2018 Nelson ................ A47C 1/0347

FOREIGN PATENT DOCUMENTS

| | | |
|---|---|---|
| CN | 2508287 Y | 8/2002 |
| CN | 202905530 U | 4/2013 |
| CN | 106579848 A | 4/2017 |
| CN | 107240523 A | 10/2017 |
| CN | 207293843 U | 5/2018 |
| CN | 109545598 A | 3/2019 |

(Continued)

OTHER PUBLICATIONS

International Search Report of PCT Patent Application No. PCT/CN2020/078128 issued on Nov. 30, 2020.

*Primary Examiner* — Lheiren Mae A Caroc

(57) ABSTRACT

A switch includes a columnar body and a pressing structure, in which an internal of the columnar body is provided with a mounting chamber penetrating upwards and downwards, the columnar body is mounted in the mounting holes; an upper end of the columnar body extends outwardly to form an extension part, the extension part fits with the sofa body; the pressing structure includes a pressing part and a key cap, and the key cap covers above the extension part. The switch has the advantages of simple structure, flexible layout on the sofa, easy replacement and high reliability.

7 Claims, 9 Drawing Sheets

(56) References Cited

FOREIGN PATENT DOCUMENTS

| | | |
|---|---|---|
| CN | 208570407 U | 3/2019 |
| CN | 211208291 U | 8/2020 |

* cited by examiner

SOFA AND SOFA SWITCH

CROSS REFERENCE TO RELATED APPLICATIONS

The present application is a Continuation application of PCT Application No. PCT/CN2020/078128 filed on Mar. 6, 2020, which claims the benefit of Chinese Patent Application No. 202010119731.3 filed on Feb. 26, 2020. All the above are hereby incorporated by reference in their entirety.

FIELD OF THE INVENTION

The present invention relates to the field of sofas, and in particular to a sofa and a sofa switch.

BACKGROUND OF THE INVENTION

A sofa, especially a functional sofa, realizes various functions such as backrest tilt, footrest extension, headrest angle adjustment and music playback, etc. by means of a switch device. As such a switch device needs to control and adjust different functions, the switch device will contain multiple switch keys in the form of sofa manual controller. According to the number of keys and key layout, etc., different kinds of manual controllers are formed. During the production of the sofa, it is not easy to assemble the hand controller by reserving or drilling the installation slot on the armrest of the sofa to assemble the hand controller. Different types of manual controllers require matching mounting slots to be reserved on the armrests at the beginning of the sofa production. It is difficult to change the use of different manual controllers on the sofas of the same batch of production line. In addition, because of the deformation of the manual controller panel and other problems, it is also prone to loose pressing parts and poor contact.

At the same time, during the use of the sofa, it was found that there is a significant difference in the frequency of use of the different function keys due to the large difference in the frequency of user demand for different functions. The function keys that are frequently used, such as the backrest tilt key, are most prone to the problem of key failure. In the repair, the entire manual controller needs to be removed and replaced as a whole, which brings trouble to the maintenance personnel and increases the maintenance cost.

SUMMARY OF INVENTION

In order to overcome at least one of the defects described above in the prior art, the present invention provides a sofa and a sofa switch.

The technical solution adopted by the present invention to solve the problem is as follows:

A sofa, characterized by comprising: a sofa body, wherein the sofa body is provided with one or more switch mounting holes; one or more switches, wherein the switches comprise a columnar body and a pressing structure, wherein an internal of the columnar body is provided with a mounting chamber penetrating upwards and downwards, the columnar body is mounted in the mounting holes; wherein an upper end of the columnar body extends outwardly to form an extension part, the extension part fits with the sofa body; and wherein the pressing structure comprises a pressing part and a key cap, the key cap covers over the extension part.

Preferably, the columnar body has threads on an outer side wall, wherein the threads match with inner threads of the mounting holes, or with the bolts, so as to fasten the columnar body.

Preferably, the sofa comprises a drive motor, wherein the switch is electrically connected to the drive motor.

Preferably, the sofa switch further comprises a key switch panel, wherein the key switch panel is installed in the mounting chamber and located below the pressing part, the pressing part is at least partially accommodated in the mounting chamber and is movable upwards and downwards in the mounting chamber to press or release the key switch panel.

Preferably, the pressing part comprises a pressing body and a plurality of elastic snap hooks extending upwardly at an oblique angle from the pressing body, an upper end of the mounting chamber is provided with a first protrusion to restrict the elastic snap hooks.

Preferably, the sofa switch further comprises a supporting part, the upper end of the mounting chamber is provided with a second protrusion, the supporting part extends into the mounting chamber from a lower end of the columnar body, a lower end of the supporting part is restricted by a lower edge of the mounting chamber, the key switch panel is clamped between the second protrusion and the supporting part.

Preferably, the supporting part is provided with a slide slot extending vertically, wherein the mounting chamber is provided with a slider that fits into the slide slot.

Preferably, the key switch panel is provided with a groove corresponding to the position of the slider, an upper end of the supporting part forms a third protrusion upwards, wherein third protrusion fits into the groove.

Preferably, an outer edge of the extension part is raised upwards to form a folded edge, wherein the folded edge encloses the key cap.

A sofa switch, characterized by comprising: a columnar body, wherein an internal of the columnar body is provided with a mounting chamber penetrating upwards and downwards, an upper end of the columnar body extends outwardly to form an extension part; a pressing structure, wherein the pressing structure comprises a pressing part and a key cap; the key cap covers over the extension part.

Preferably, the columnar body has threads on the outer side wall, wherein the threads match with the inner threads of the mounting holes, or with the bolts, so as to fasten the columnar body.

Preferably, the sofa switch further comprises the key switch panel, wherein the key switch panel is installed in the mounting chamber and located below the pressing part, the pressing part is at least partially accommodated in the mounting chamber and is movable upwards and downwards in the mounting chamber to press or release the key switch panel.

Preferably, the pressing part comprises the pressing body and a plurality of elastic snap hooks extending upwardly at the oblique angle from the pressing body, the upper end of the mounting chamber is provided with the first protrusion to restrict the elastic snap hooks.

Preferably, the sofa switch further comprises the supporting part; the upper end of the mounting chamber is provided with the second protrusion, the supporting part extends into the mounting chamber from the lower end of the columnar body, the lower end of the supporting part is restricted by the lower edge of the mounting chamber; the key switch panel is clamped between the second protrusion and the supporting part.

Preferably, the supporting part is provided with the slide slot extending vertically, and the mounting chamber is provided with the slider that fits into the slide slot.

Preferably, the key switch panel is provided with the groove corresponding to the position of the slider, the upper end of the supporting part forming a third protrusion upwards, wherein the third protrusion fits into the groove.

Preferably, the outer edge of the extension part is raised upward to form the folded edge, wherein the folded edge encloses the key cap.

The present invention provides the sofa and the sofa switch, wherein only a columnar mounting hole is necessary to be provided on the sofa body such as an armrest of the sofa, then the columnar body of the switch shall be fitted into the mounting hole. This type of mounting hole is smaller than a slot of a manual controller. The sofa switches of the present invention may be flexibly arranged according to the different layout of the switch keys in the sofa production line. Furthermore, this kind of sofa switch adopts the form of independent key. When one key has a problem, it may be replaced easily without affecting the function of other keys.

In summary, the sofa and sofa switch provided by the present invention have the following technical effects:

The switch has a simple structure, and the keys may be arranged flexibly, which may be realized by reserving simple column holes for the sofa or temporarily drilled holes during installation.

The replacement of sofa switch is simple and convenient. The maintenance cost is reduced.

The mutual cooperation between the elastic hook and the first protrusion in the mounting chamber may realize the rapid disassembly and installation of the pressing parts, which facilitate the assembly of the key switch, which may prevent the pressing parts from loosening or disengaging from the upper end of the mounting chamber to cause poor contact problems, thereby improving the user experience.

Figure 1:
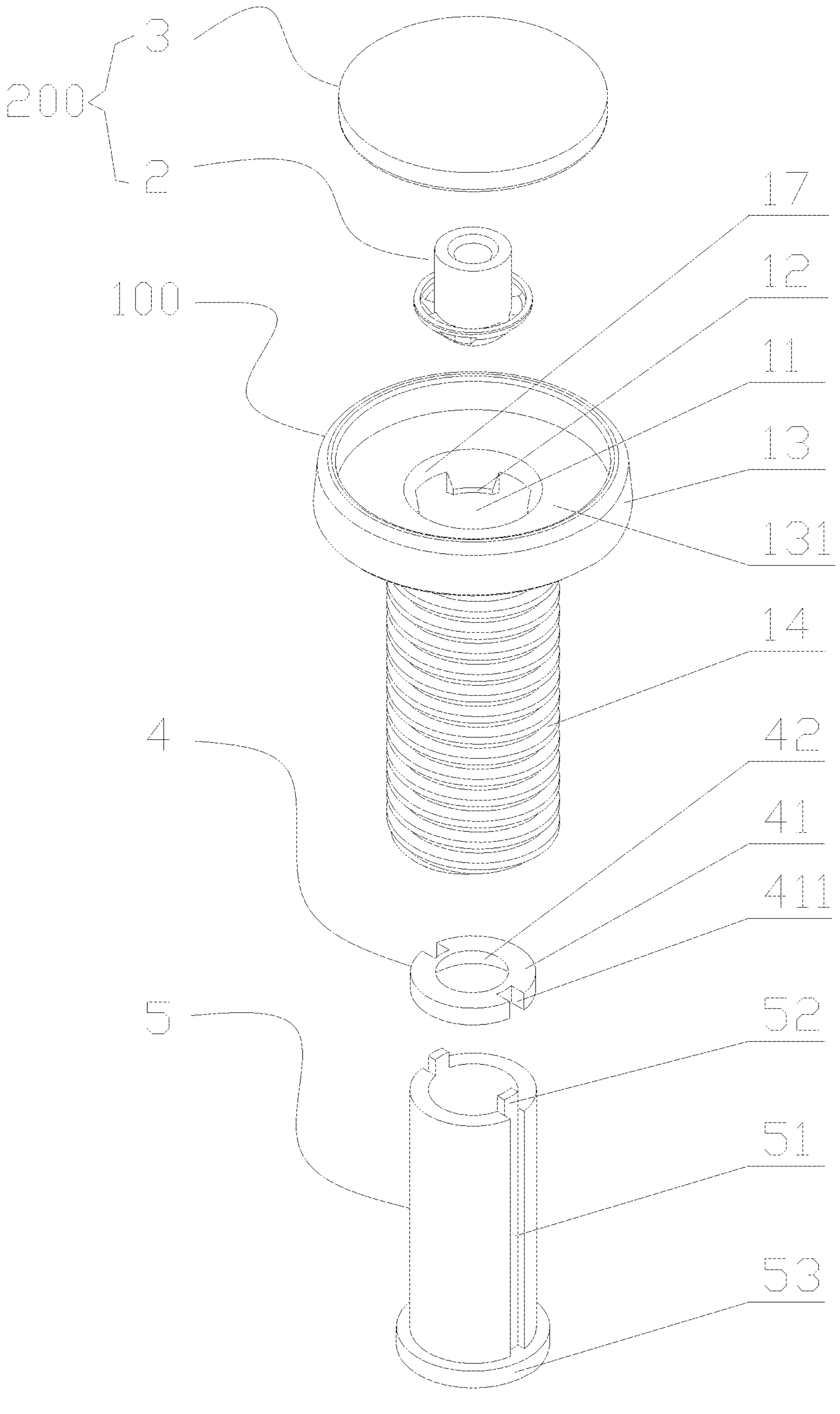
FIG. 1 is a diagram of the exploded structure of embodiment 1 of the present invention.

100: columnar body; 200: pressing structure; 11: mounting chamber; 12: the first protrusion; 13A: extension part; 13B: folded edge; 13: outer edge; 131: accommodation chamber; 14: external thread; 15: the second protrusion; 16: slider; 17: chamfer; 18: L-shaped slot; 181: vertical section; 182: horizontal section; 183: positioning slot; 19: guide slot; 2: pressing parts; 21: pressing body; 211: slot; 22: elastic snap hook; 23: elastic plate ring; 24: step-shaped cushion; 25: limiting slide; 26: escape slot; 3: key cap; 31: inserted shaft; 4: key switch panel; 41: substrate; 411: groove; 42: contact spring piece; 43: key; 5: supporting part; 51: chute; 52: the third protrusion; 53: bracket; 501: placing chamber; 502: connecting slot; 54: upper cap; 541: sleeve; 542: locking piece; 5421: positioning protruding point; 55: bottom shell; 6: elastic part; 7: nut

DETAILED DESCRIPTION OF THE EMBODIMENTS

For better understanding and implementation, the technical solution in the embodiment of the present invention will be clearly and completely described below in combination with the attached drawings in the embodiment of the present invention.

In the description of the present invention, specifically, the orientation or positional relationship indicated by the terms namely, "up", "down", "before", "after", "left", "right", "vertical", "horizontal", "top", "bottom", "inside" and "outside" is based on the orientation or positional relationship shown in the attached drawings, which is only for the purpose of facilitating and simplifying the description of the invention, with no intention to indicate or imply that the device or element must have a specific orientation or construct and operate in a specific orientation. Therefore, they may not be construed as a limitation of the present invention.

Unless otherwise defined, all technical and scientific terms used herein have the same meanings as ordinarily understood by a skilled person in the technical field of the present invention. The terms used herein in the specification of the present invention are used only for the purpose of describing specific embodiments and are not intended to restrict the invention.

Embodiment 1

The embodiment of the present invention discloses a sofa. The sofa comprises a sofa body and a sofa switch, wherein the number of sofa switches is one or more; and the number of switches is determined according to the type of function of the sofa. The sofa body comprises sitting part, armrest, backrest, footrest, iron frame, etc. The present invention is generally more applicable to functional sofas, for which the switch provides control adjustment.

The switch mounting hole, which is corresponding to the switch, is provided on the sofa body. In the present embodiment, the switch mounting hole is arranged above the armrest of the sofa, where the hand is placed when a person sits on the sofa, so that the switch may be operated easily. In the present embodiment, the switch mounting hole is cylindrical in shape and has a thread on the inner surface, which is fitted into the mounting hole by the thread. Such a structure may be used for the mounting and fixing of the switch, which will be described in the following.

The removable connection between the components of the sofa switch is realized by the elastic snap hook on the pressing part in conjunction with the first protrusion in the mounting chamber. When assembling, the pressing part may be pressed from the upper end of the mounting chamber into the mounting chamber while the first protrusion is used to limit the disengaging of the pressing part from the upper end of the mounting chamber. When disassembling, the key switch panel is first removed, and then the pressing part is pushed downwards from the columnar body along the mounting chamber with a tool, so as to realize the quick disassembly and assembly of the pressing part, which facilitates the assembly of the key switch, which prevent the pressing part from loosening or disengaging from the upper end of the mounting chamber to cause poor contact problems, thereby improving the user experience.

In the present embodiment, the sofa also comprises a drive motor that drives the iron frame extension to achieve the tilt of the backrest and the extension of the footrest. The switch is electrically connected to the drive motor and may control the forward or reverse rotation of the drive motor.

Figure 2:
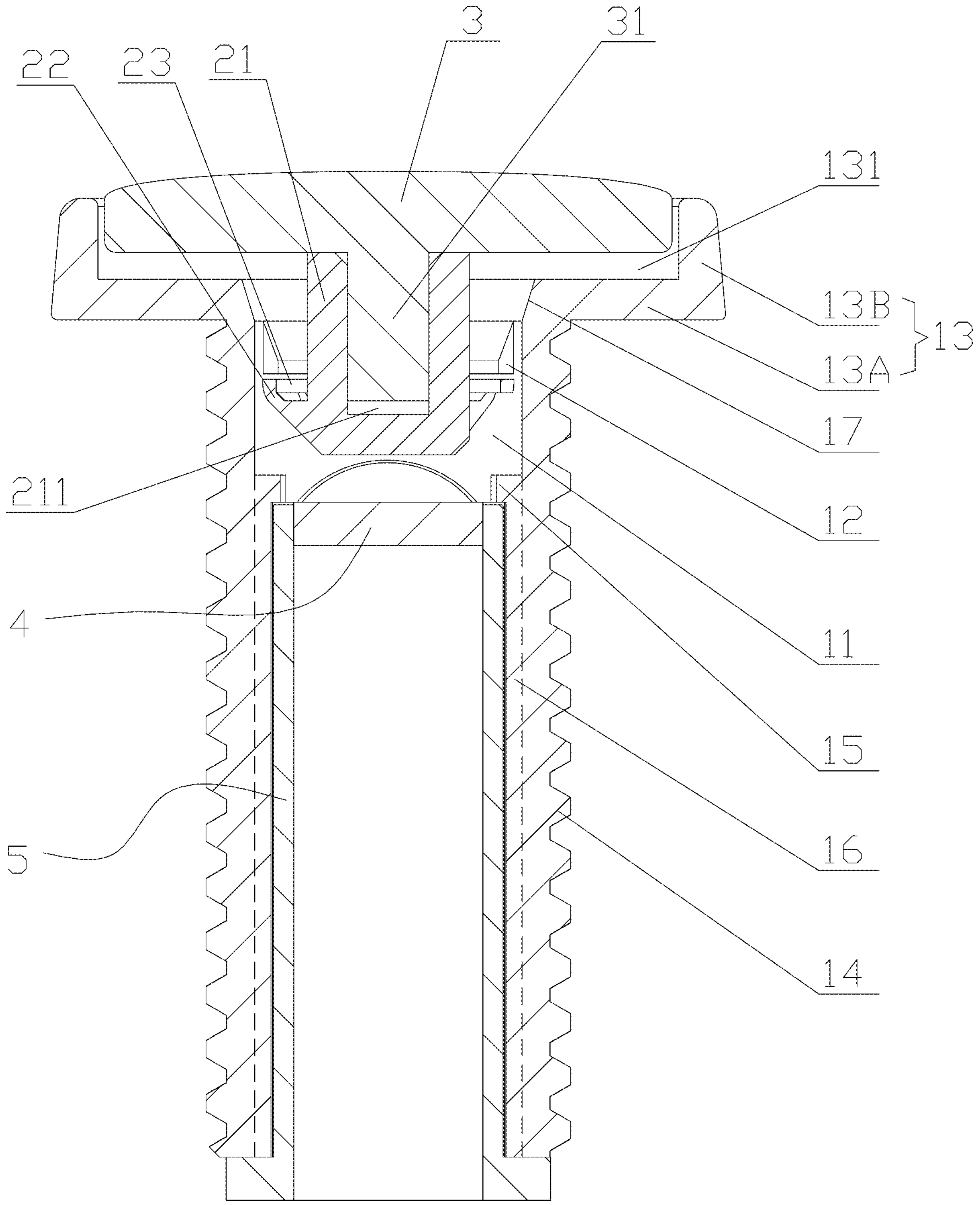
FIG. 2 is a diagram of the sectional structure of embodiment 1 of the present invention.

Referring to FIG. 1 and FIG. 2, the sofa switch of an embodiment of the present invention comprises a columnar body 100, a pressing structure 200, a key switch panel 4, and a supporting part 5. The columnar body 100 is substantially columnar in shape. The columnar shape is a geometric body of a certain shape extending upwards from the ground. In the present embodiment, the columnar body 100 is cylindrical in shape. The columnar body 100 is hollow inside and is provided with mounting chamber 11 penetrating upwards and downwards inside. The mounting chamber 11 is cylindrical in shape. Both the upper and lower ends of the columnar body 100 are open ended.

The upper end of the columnar body 100 also extends outwardly to form an extension part 13A, which will fit the upper surface of the sofa armrest when the sofa switch is mounted on the sofa armrest. In the present embodiment, the extension part 13A is annular in shape. The outer edge of the annular extension part 13A is raised upwards to form a folded edge 13B.

As shown in FIG. 1, the pressing structure 200 comprises a pressing part 2 and a key cap 3. The pressing part 2 is at least partially accommodated and movably provided in the mounting chamber 11. The pressing part 2 is provided in the upper end of the mounting chamber 11. The key cap 3 is provided at the upper end of the mounting chamber 11. The key cap 3 also fits over the upper part of the extension part 13A.

In the present embodiment, the pressing part 2 and the key cap 3 are removably connected to each other. Referring to FIG. 2, in the present embodiment, the pressing body 21 is provided with a slot 211. The key cap 3 is provided with an inserted shaft 31 that fits into the slot 211. The inserted shaft 31 is in transition fit or interference fit or thread fit with the slot 211 so that the key cap 3 is fixed relative to the pressing part 2.

The key switch panel 4 is removably provided in the mounting chamber 11. The key switch panel 4 is provided below the pressing part 2. The pressing part 2 comprises a pressing body 21 and a number of elastic snap hooks 22. The elastic snap hooks 22 extend upwardly at an oblique angle from the pressing body 21.

The mounting chamber 11 is provided with a first protrusion 12 for restricting the elastic hook 22. There are five first protrusions 12, which are circumferentially and evenly distributed at the upper end of the mounting chamber 11. The pressing body 21 is cylindrical in shape. Five elastic snap hooks 22 are circumferentially and evenly distributed at the lower end of the pressing body 21, wherein the outer diameter of the arranged circumference of the elastic snap hook 22 is smaller than the inner diameter of the mounting chamber 11 and larger than the outer diameter of the arranged circumference of the first protrusion 12. The diameter of the pressing body 21 is smaller than the outer diameter of the arranged circumference of the first protrusion 12 so that the pressing part 2 is stuck under the first protrusion 12 under the elastic deformation of the elastic snap hook 22.

Thus, when pressing the pressing part 2 into the mounting chamber 11, the first protrusion 12 squeezes the elastic snap hook 22 to produce elastic deformation. When the elastic snap hook 22 breaks away from the first protrusion 12, the elastic snap hook 22 resiliently recovers to snap in the lower end of the first protrusion 12, so that the first protrusion 12 is used to restrict the pressing part 2 from breaking away from the upper end of the mounting chamber 11. When disassembling, the key switch panel 4 is disassembled first. Then, the pressing part 2 is pushed away from the columnar body 100 along the mounting chamber 11 with a tool, so that the pressing part 2 may be quickly disassembled and assembled, which facilitates the assembly of the key switch and prevents the pressing part 2 from loosening or disengaging from the upper end of the mounting chamber 11 to cause the problem of poor contact, thereby improve the user experience.

In other embodiments, there may be two or three or four etc. of the first protrusion 12, and the first protrusion 12 may also be provided in a ring shape in the mounting chamber 11. There may be two or three or four etc. of the elastic snap hook 22, to achieve the relative restriction between the first protrusion 12 and the elastic snap hook 22.

Figure 4:
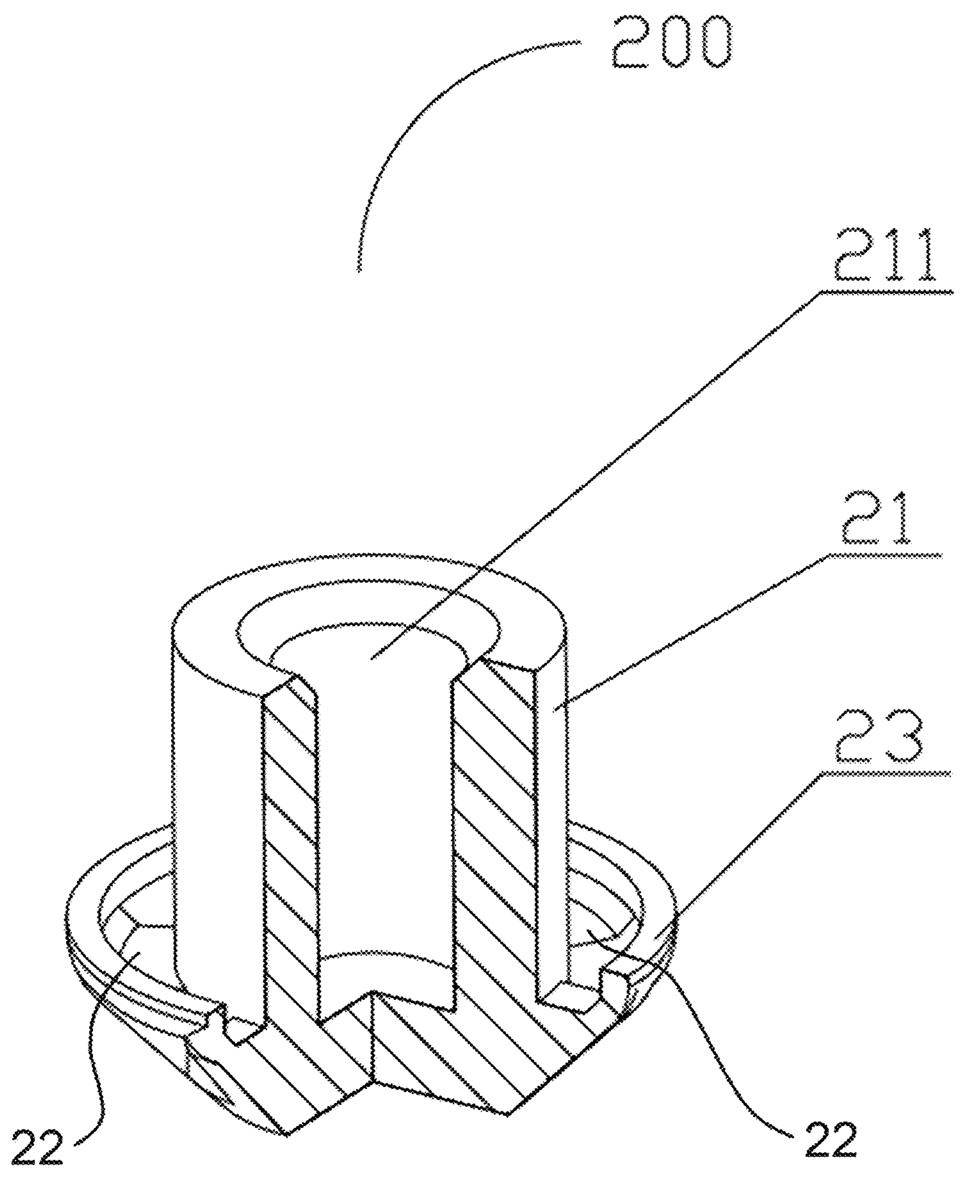
FIG. 4 is a diagram of the structure of the pressing part shown in FIG. 1.

Referring to FIG. 4, in the present embodiment, the pressing part 2 further comprises an elastic plate ring 23. The elastic plate ring 23 is attached to the upper end of a number of elastic snap hooks 22. The first protrusion 12 abuts the elastic plate ring 23 to restrict the pressing part 2 from disengaging from the mounting chamber 11, wherein the axis of the elastic plate ring 23 is in line with the axis of the pressing body 21; the lower end of the elastic plate ring 23 is connected to the upper end of the elastic snap hook 22; the outer diameter of the elastic plate ring 23 is equal to the outer diameter of the arranged circumference of the elastic snap hook 22; and the upper end of the elastic plate ring 23 is restricted against the lower end of the first protrusion 12 to prevent the elastic snap hook 22 from being clamped between the two first protrusions 12 and maintain the flexibility of the pressing part 2.

In the present embodiment, the upper end of the mounting chamber 11 is provided with a chamfer 17. The guiding function of the chamfer 17 is used to facilitate the installation of the pressing part 2 into the mounting chamber 11.

In the present embodiment, the key switch panel 4 comprises a substrate 41 and a contact spring piece 42 provided on the substrate 41. The pressing body 21 touches the contact spring piece 42. When the key cap 3 is pressed, the pressing part 2 drives the contact spring piece 42 to deform to connect the two wiring contacts on the substrate 41 to realize an electrical connection. When the key cap 3 is no longer pressed, the contact spring piece 42 is reset under the action of elasticity and drives the pressing part 2 to move up and reset, so that the two wiring contacts on the substrate 41 are electrically disconnected.

In the preferred embodiment, the contact spring piece 42 is made of silicone material. In such case, the contact spring piece 42 may provide greater cushioning and withstand greater pressure from the pressing body 21.

Referring to FIG. 2, in the present embodiment, the extension part 13A is integral with the folded edge 13B as the outer edge 13. The shape of the outer edge 13 will form the accommodation chamber 131. The accommodation chamber 131 holds the key cap 3. The folded edge 13B encloses the key cap 3 to protect the key cap 3 from being easily collided and detached from the pressing part 2, and to keep the switch flat.

Referring to FIG. 1 and FIG. 2, in the present embodiment, the sofa switch further comprises a supporting part 5 provided in the mounting chamber 11. The supporting part 5 supports the key switch panel 4.

Figure 3:
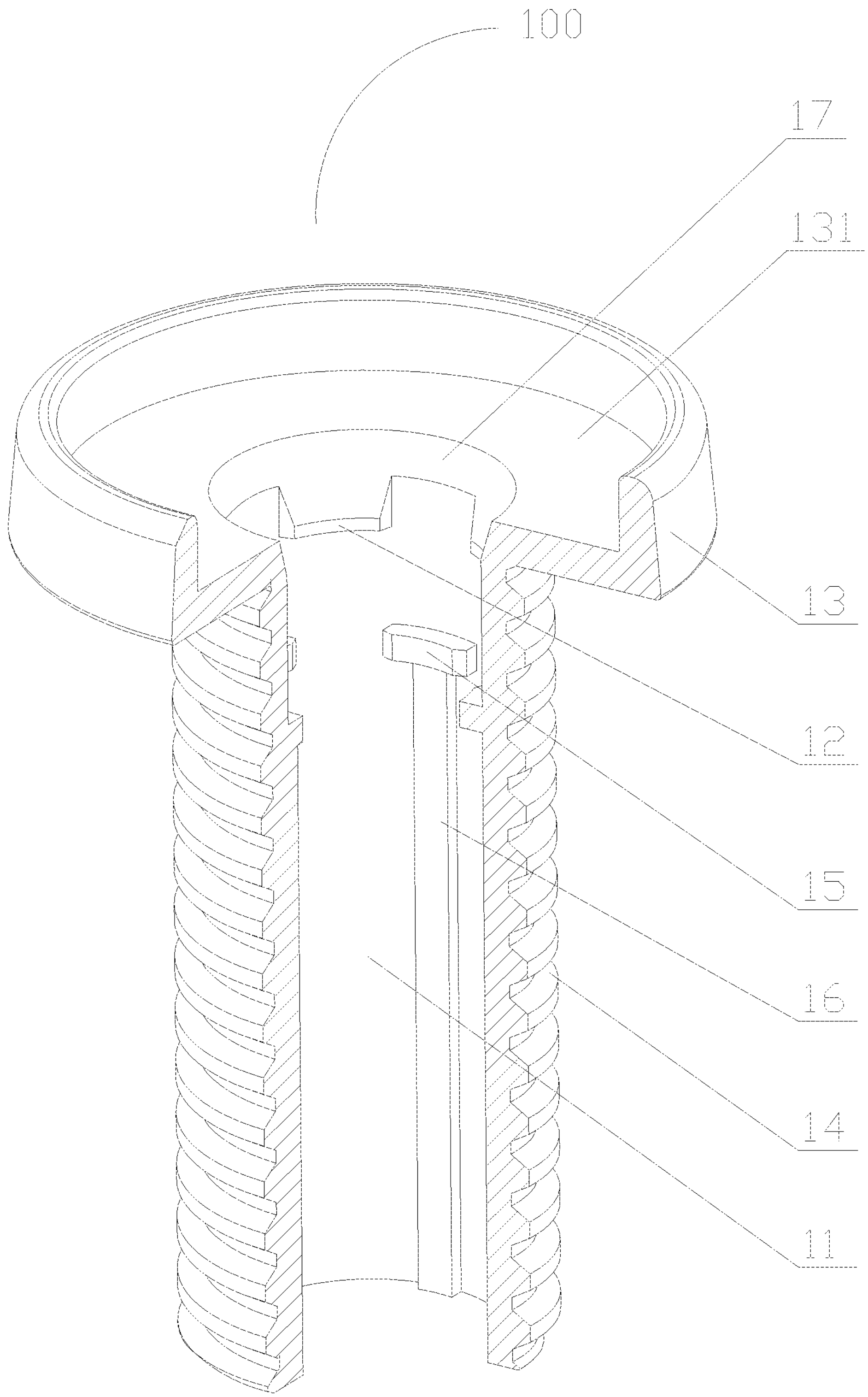
FIG. 3 is a diagram of the structure of the columnar body shown in FIG. 1.

Specifically, the supporting part 5 is mounted in a tubular transition or interference fit in the mounting chamber 11. The lower end of the supporting part 5 extends radially outwardly with a bracket 53 for engaging the lower end of the columnar body 100. In this way, the lower end of the supporting part 5 is restricted by the lower edge of the mounting chamber 11. The supporting part 5 is symmetrically provided with two slots 51 extending vertically. The supporting part 5 is symmetrically provided with two third protrusions 52 at the top. The third protrusions 52 are formed by protruding upwards at the upper end of the supporting part 5, specifically distributed at the position of the upper end of the slots 51. Referring to FIG. 2-FIG. 4, the mounting chamber 11 is also provided with four second protrusions 15 and two sliders 16. Four second protrusions 15 are evenly distributed along the axial circumference of the mounting chamber 11. The key switch panel 4 is clamped between the second protrusions 15 and the supporting part 5. The slider 16 is in the form of a rib, extending in the vertical direction. The slider 16 fits correspondingly with the slots 51 to facilitate the mounting and positioning of the supporting part 5. The key switch panel 4 is provided with two grooves 411 corresponding to the position of the slider 16. The third protrusion 52 engages the grooves 411. Thus, the supporting part 5 clamps the key switch panel 4 under the second protrusion 15 and restricts the key switch panel 4 from rotating and moving, thereby forming a fixed positioning.

Wherein the second protrusion 15 has an outer diameter of the arranged circumference greater than the diameter of the pressing body 21, and the thickness of the slider 16 is less than the thickness of the second protrusion 15 to facilitate elastic deformation of the pressing part 2 from the lower end of the mounting chamber 11 away from the columnar body 100.

In the present embodiment, the specific number of slots 51, third protrusion 52, second protrusion 15, slider 16 and groove 411 is not within the limits of the present embodiment to achieve relative fixed positioning between the supporting part 5, key switch panel 4 and columnar body 100.

In the present embodiment, in order to facilitate the installation of the columnar body 100 on the sofa, the outer side wall of the columnar body 100 is provided with an external thread 14, which may be fixed to the sofa by the user by screwing or by clamping with a mounting nut.

Through the mutual cooperation of the elastic snap hook 22 with the mounting chamber 11 and the first protrusion 12, the pressing part 2 may be quickly and removably installed, which facilitates the assembly of the sofa switch, which prevents the pressing part 2 from loosening or disengaging from the upper end of the mounting chamber 11 to cause the problem of poor contact, thereby improving the user experience.

Embodiment 2

Referring to FIG. 5 to FIG. 9, this embodiment also discloses a sofa switch. The difference between the sofa switch of the present embodiment and the sofa switch of embodiment 1 is that the switch components used in the sofa switch of the present embodiment are external, while the switch components of embodiment 1 are internal.

The solution of the present implementation may further solve the problem of inappropriate assembly when using external switch components.

In the present embodiment, the sofa switch also comprises: a columnar body 100, a pressing structure 200, a key switch panel 4, and a supporting part 5. Further, the sofa switch may also comprise an elastic part 6 and a nut 7.

Unlike embodiment 1, in the present embodiment, the supporting part 5 is provided with a placing chamber 501 and a connecting slot 502 connected to the placing chamber 501, and the key switch panel 4 is located in the placing chamber 501. The columnar body 100 is removably connected to the supporting part 5.

The columnar body 100 is provided with a mounting chamber 11, and the mounting chamber 11 is connected to the placing chamber 501, and the pressing structure 200 is slidably arranged on the mounting chamber 11, and the elastic part 6 is provided to elastically drive the pressing structure 200 to reset, so that the pressing structure 200 slides to press against or disengage the key 43 of the key switch panel 4 to realize the opening and closing operation of the key switch panel 4.

Specifically, the elastic part 6 is a spring, which is located in the mounting chamber 11, and the two ends of the spring are attached to the columnar body 100 and the pressing structure 200 respectively, so as to provide elastic force to drive the pressing structure 200 to slide and reset in the direction away from the key switch panel 4. Of course, the elastic part 6 may also provide the resetting elastic force in other known ways for the pressing structure 200, such as spring piece, elastic rubber pad, tension spring, etc. Alternatively, the elastic part 6 may also be connected between the pressing structure 200 and the key switch panel 4, or between the pressing structure 200 and the supporting part 5, as long as it is capable of providing a resetting elastic force for the pressing structure 200.

In the sofa switch of the present embodiment, the supporting part 5 is assembled with the key switch panel 4 to form the switch module, and the columnar body 100, the pressing structure 200 and the elastic part 6 are assembled to form the key module. In the process of assembling the sofa switch to the sofa, the key module passes through the mounting holes in the sofa and is then secured to the sofa through the fitting of the nut 7. Specifically, the outer side wall of the columnar body 100 is provided with an external thread 14 that fits with the nut 7, and the nut 7 is set into the columnar body 100 by the end of the columnar body 100 near the supporting part 5 and screwed to the external thread 14, so as to fix the key module to the sofa; then the switch module is mounted to the key module to realize the overall installation of the sofa switch on the furniture. When in use, the pressing structure 200 is pressed to open and close the key switch panel 4, thereby enabling control of the operating parts on the furniture.

However, the conventional installation method between the switch module and the key module will have the following problems: due to carelessness or inappropriate operation during assembly, the supporting part 5 and the columnar body 100 are only initially inserted but not fastened, and the static friction between them causes them not to be loosened, so that during the subsequent product testing process, the detected result is that the key switch may work normally; and this will lead to the supporting part 5 and the columnar body 100 are easily loosened during long-term use, causing the sofa not to be used normally.

Figure 6:
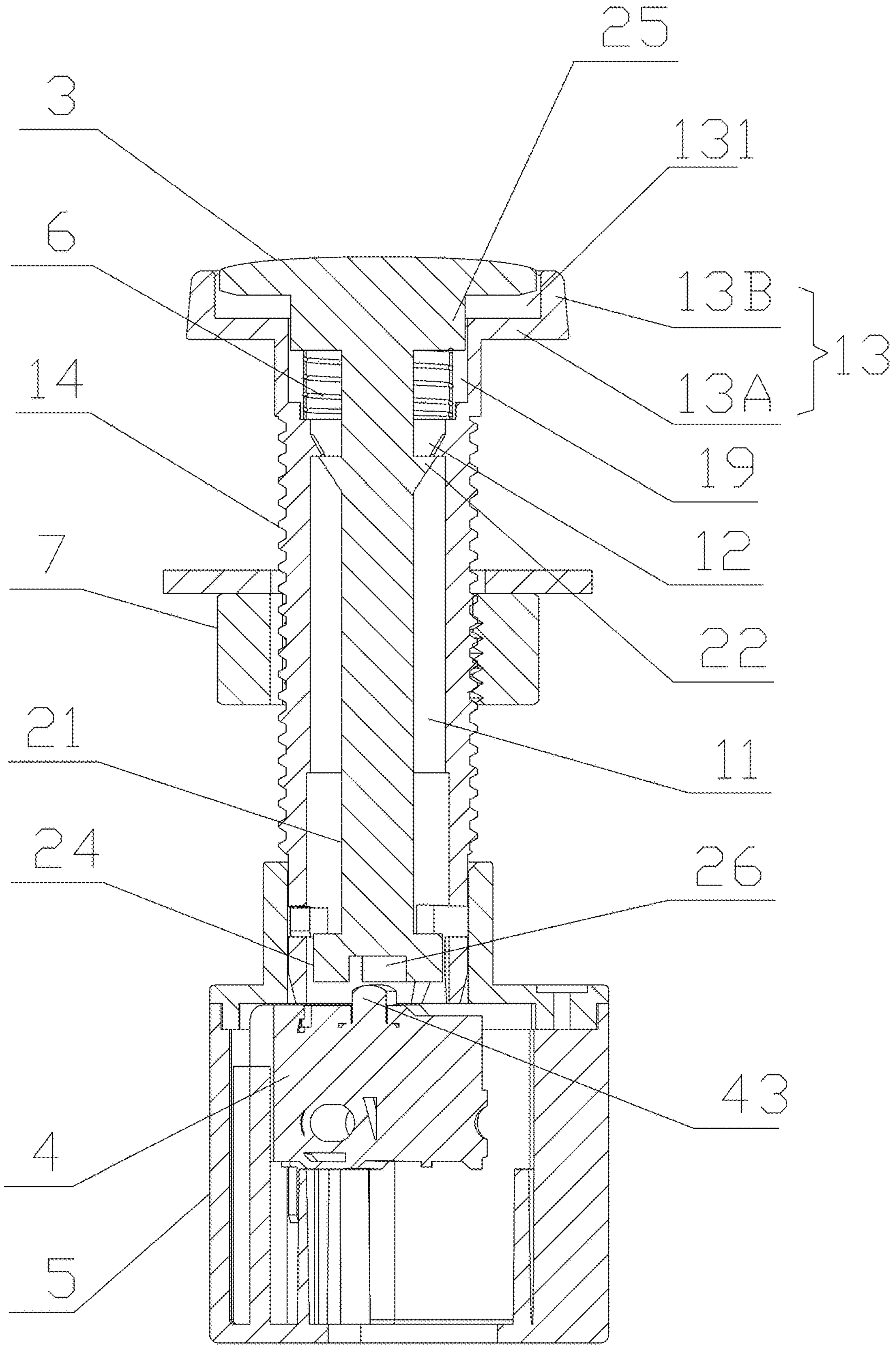
FIG. 6 is a diagram of the cross-sectional structure of embodiment 2 of the present invention.
Figure 7:
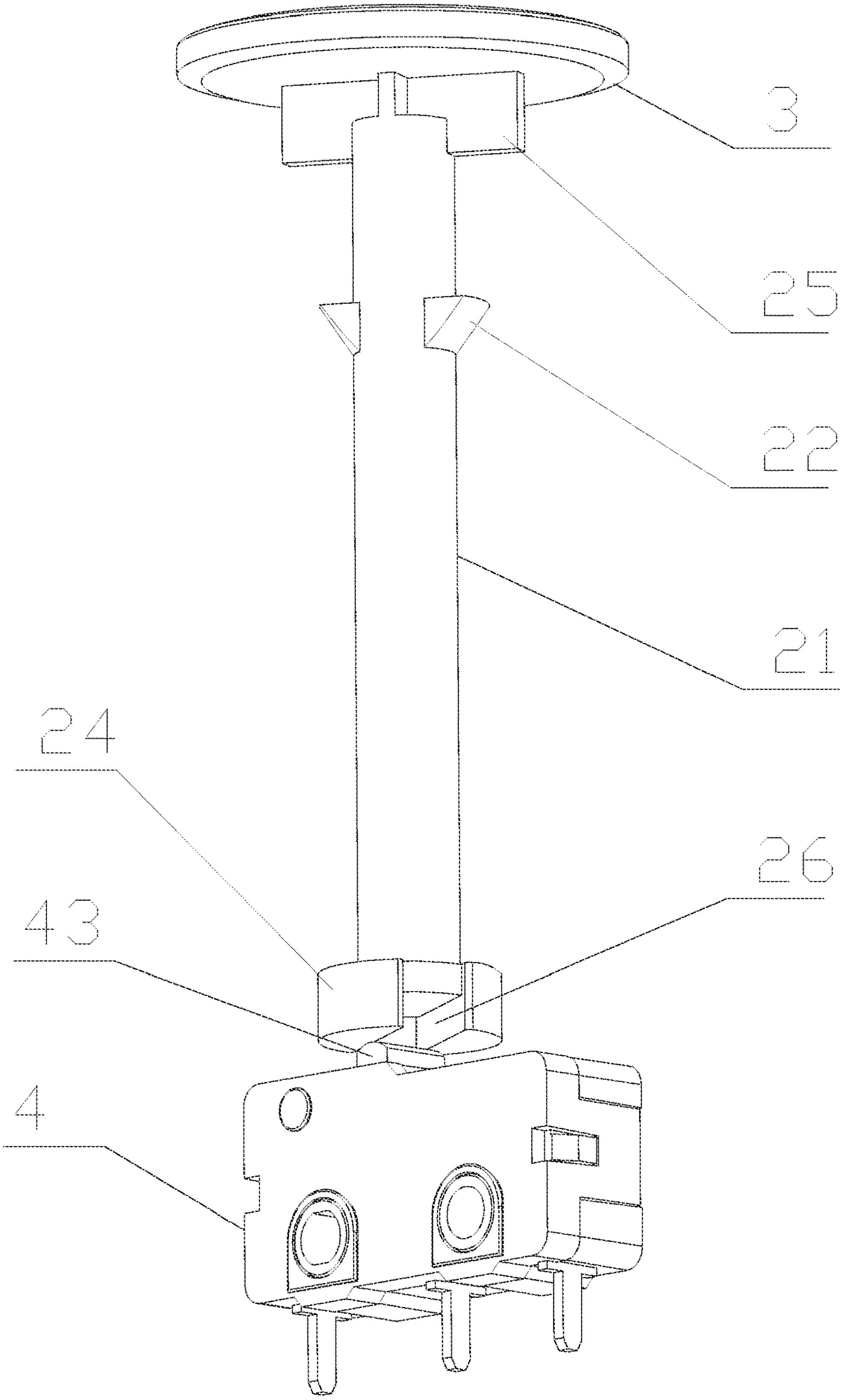
FIG. 7 is a diagram of the structure of the pressed structure of embodiment 2 of the present invention in conjunction with the switch member.

Referring to FIG. 6 and FIG. 7, it is important that one end of the columnar body 100 is inserted into the connecting slot 502 from the outside to the inside, and is rotated from the first position to the second position to be fastened to the connecting slot 502, and the pressing structure 200 is able to rotate simultaneously with the columnar body 100. That is to say, it is understood that the pressing structure 200 may only slide relative to the columnar body 100 and may not rotate relative to the columnar body 100, and the end of the key 43 of the pressing structure 200 for pressing against the key switch panel 4 is provided with an escape slot 26; wherein, in the first position, the escape slot 26 accommodates the key 43 to disable the opening and closing operation, and in the second position, the escape slot 26 is misaligned with the key 43 to allow the opening and closing operation to work properly.

It is to be noted that in the state of the first position, i.e. the position of the columnar body 100 when it is inserted only into the connection slot 502, there will be a certain amount of static friction between the columnar body 100 and the connecting slot 502. However, the columnar body 100 and the connecting slot 502 may be released when a certain push or pull or vibratory force is applied (e.g., the pressing structure 200 acts on the key switch panel 4 for a number of pressures). In the state of the second position, i.e., the position of the columnar body 100 when it is screwed and fixed in the connecting slot 502, the columnar body 100 and the connecting slot 502 are fixed by the clamping force, which is more stable and will not be loosened.

In addition, it is understandable that the failure of the opening and closing operation is manifested by: When the pressing structure 200 is pressed, the pressing end of the pressing structure 200 does not properly press against the key 43, i.e. the key switch panel 4 does not work properly, resulting in the non-operation of the operating parts on the sofa under its control; The normal operation of the opening and closing operation is manifested by: When the pressing structure 200 is pressed, the pressing end of the pressing structure 200 normally presses against the key 43, i.e. the key switch panel 4 works normally and the operating parts on the sofa under its control work normally. In this way, the proper functioning of the sofa switch may be observed more visually.

In the process of assembling the sofa switch to the sofa, in the first position, the escape slot 26 corresponds exactly to the key 43. In this state, the pressing structure 200 is pressed to slide towards the key switch panel 4. Since the escaping effect of the escape slot 26, the key 43 may be accommodated in the escape slot 26, so that the end of the pressing structure 200 may not be pressed against the key 43 normally, thereby making the opening and closing operation of the pressing structure 200 on the key switch panel 4 invalid; In the second position, the escape slot 26 is misaligned with the key 43. In this state, the pressing structure 200 is pressed to slide towards the key switch panel 4. Since the escape slot 26 is misaligned with the key 43, the key 43 may not be accommodated in the escape slot 26, so that the end of the pressing structure 200 may be pressed against the key 43 normally, and thus the opening and closing operation of the key switch panel 4 by the pressing structure 200 works normally.

Through the above scheme, only after the columnar body 100 is correctly mounted to the supporting part 5, the pressing structure 200 may normally open and close the key switch panel 4, which may be more conveniently tested through the production and inspection process before leaving the factory, solving the problem that the sofa switch is not assembled properly when applied to the sofa, improving the user experience, and reducing the failure rate and repair rate.

Referring to FIG. 7, specifically, the escape slot 26 and key 43 are in the shape of an elongated strip and the two shapes are adapted to each other. When in the first position, the escape slot 26 and key 43 are arranged in parallel. When in the second position, the escape slot 26 and key 43 are arranged to intersect to achieve the accommodation or not between the escape slot 26 and key 43 in different positions.

Of course, in other embodiments, the escape slot 26 and the key 43 may also be diamond-shaped, oval-shaped, etc. The relative positions of the escape slot 26 and the key 43 may also be arranged eccentrically (it is understood that the escape slot 26 and the key 43 are not located on the axis of rotation of the pressing structure 200), that is, in the first position, the positions of the escape slot 26 and the key 43 are directly opposite to each other. In the second position, the positions of the escape slot 26 and the key 43 are misaligned after rotation.

Preferably, the recessed depth of the escape slot 26 is greater than the protruding height of the key 43. In this way, in the first position, after pressing the pressing structure 200, the end surface of the pressing structure 200 will be against the upper surface of the key switch panel 4 to maintain a gap between the bottom wall of the escape slot 26 and the top of the key 43 to avoid affecting the normal detection results due to the sensitivity of the key 43.

Referring to FIG. 6 and FIG. 7, in the present embodiment, the pressing structure 200 comprises an integrally formed key cap 3, a pressing part 2, an elastic snap hook 22, a step-shaped cushion 24 and a limiting slide 25, wherein one end of the pressing part 2 is connected to the step-shaped cushion 24; the escape slot 26 is located on the step-shaped cushion 24; the other end of the pressing part 2 is connected to the key cap 3; the elastic snap hook 22 is connected to the pressing part 2; and the limiting slide 25 is connected between the key cap 3 and the pressing part 2, or the limiting slide 25 may also be connected to either the key cap 3 or the pressing part 2.

In the above scheme, the step-shaped cushion 24 is used to support the escape slot 26 in order to achieve the indirect setting of the escape slot 26 at the end of the pressing part 2, which may reduce the cross-sectional area of the pressing part 2 and reduce the material used in the pressing part 2 while meeting the size requirement of the escape slot 26. Of course, in other preferred embodiments, the escape slot 26 may also be provided directly on one end of the pressing part 2. At this time, the hollow design of the pressing member 2 or the gradient design of the cross-sectional area may be used to achieve the purpose of reducing the material used in the pressing part 2.

Figure 8:
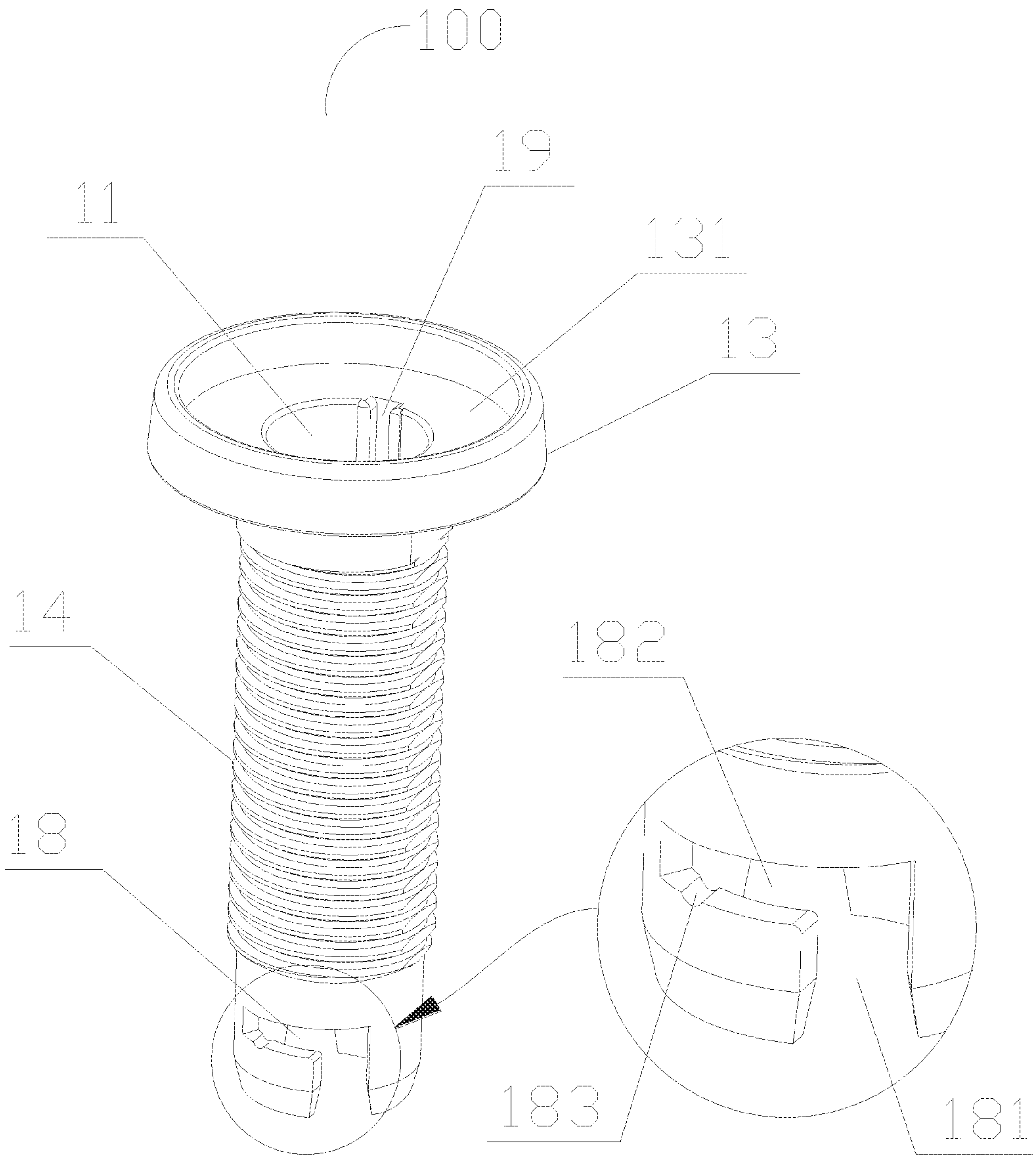
FIG. 8 is a diagram of the structure of the columnar body of embodiment 2 of the present invention.

Referring to FIG. 6 and FIG. 8, in the present embodiment, a first protrusion 12 and a guide slot 19 are provided in the mounting chamber 11 of the columnar body 100.

Wherein the elastic snap hook 22 and the first protrusion 12 are against each other to restrict the pressing structure 200 from detaching from the columnar body 100. Specifically, there are two elastic snap hook 22 and two first protrusion 12, each corresponding to another. The first protrusion 12 is located between the elastic snap hook 22 and the key cap 3. When the pressing structure 200 is elastically slid by the elastic part 6, the first protrusion 12 is against the side of the elastic snap hook 22 toward the key cap 3 so as to achieve fixed positioning.

Wherein the limiting slide 25 slides on the guide slot 19 in the sliding direction of the pressing part 2, so that the pressing structure 200 may only slide relative to the columnar body 100 and may not rotate relative to the columnar body 100.

Figure 5:
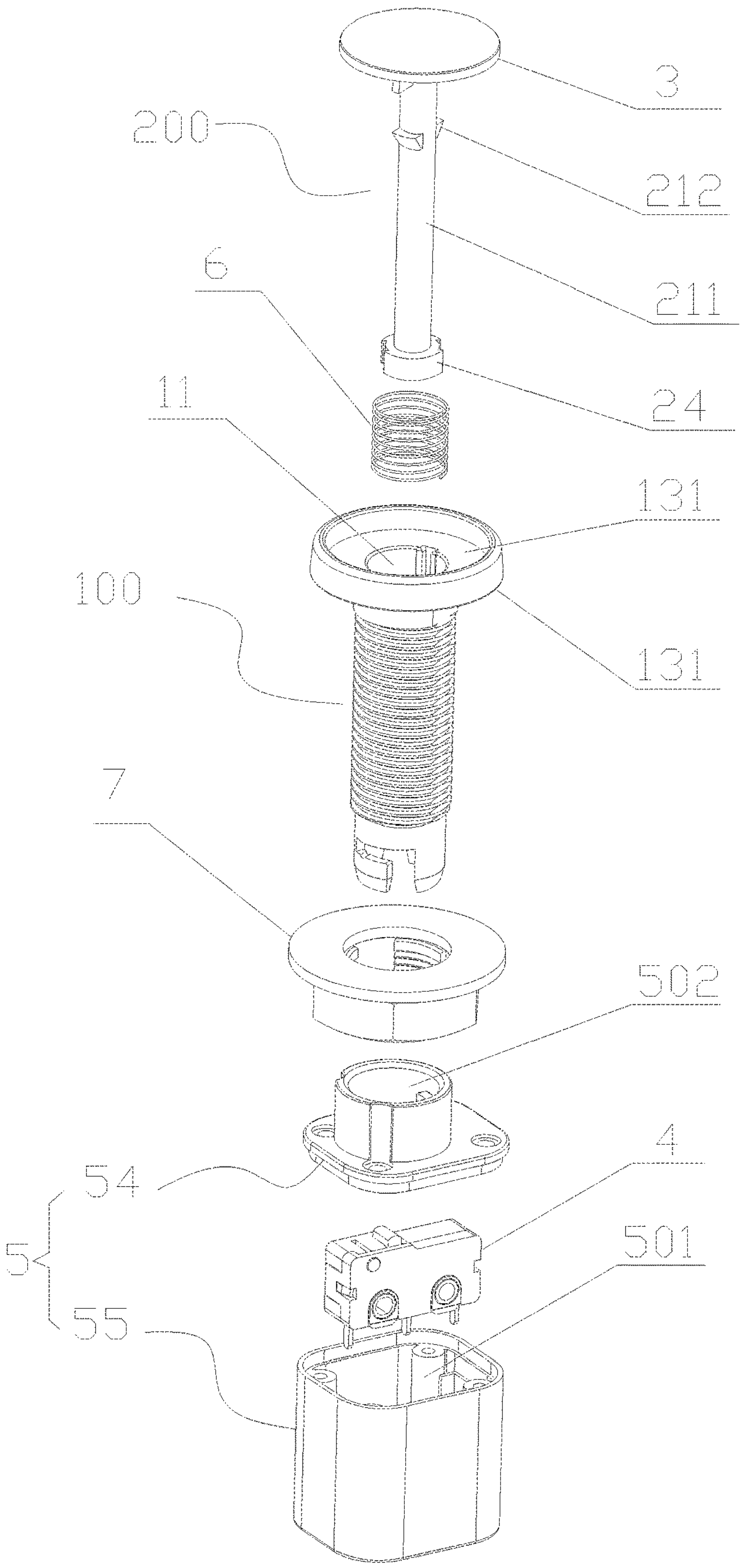
FIG. 5 is a diagram of the exploded structure of embodiment 2 of the present invention.
Figure 9:
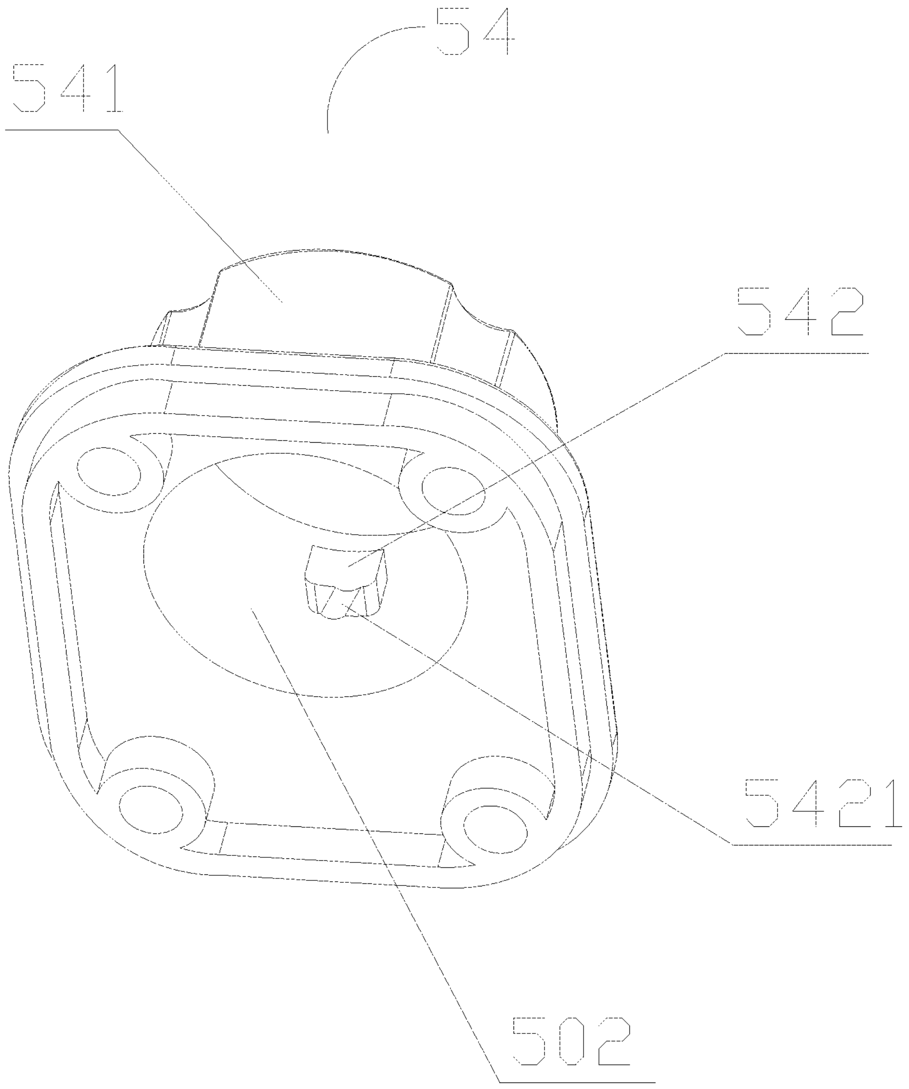
FIG. 9 is a diagram of the structure of the upper cover of embodiment 2 of the present invention.

Referring to FIG. 5 and FIG. 9, in the present embodiment, the supporting part 5 comprises an upper cap 54 and a bottom shell 55. A placing chamber 501 is formed between the upper cap 54 and the bottom shell 55. The key switch panel 4 is mounted in the bottom shell 55. The upper cap 54 is covered in the open end of the bottom shell 55. The outer surface of the upper cap 54 is protruding to form a sleeve 541. The sleeve 541 is hollow to form a connecting slot 502. Through the connecting slot 502 formed in the sleeve 541 to connect the columnar body 100, the volume of the bottom shell 55 may be reduced, the materials used may be reduced, and the space utilization rate may be enhanced.

Combined with FIG. 8, in order to realize the rotational fastening of the columnar body 100 on the supporting part 5, one end of the columnar body 100 for insertion into the connecting slot 502 is provided with an L-shaped slot 18. The L-shaped slot 18 comprises a connected vertical section 181 and a horizontal section 182. The vertical section 181 penetrates to the end surface of the columnar body 100. The connecting slot 502 is provided with a locking piece 542 that fits into the L-shaped slot 18.

Specifically, there are two L-shaped slot 18 and two locking piece 542 and they are arranged along the circumference of the columnar body 100. The width of the locking piece 542 matches the width of the vertical section 181. The height of the locking piece 542 matches the width of the horizontal section 182.

In particular, the horizontal section 182 is provided with a positioning slot 183. The locking piece 542 is provided with a positioning protruding point 5421 that fits into the positioning slot 183 to avoid accidental loosening and detaching of the locking piece 542 out of the horizontal section 182 or the entire L-shaped slot 18.

The assembly process of the switch module and the key module of the sofa switch of the present invention is as follows:

(a) Align the end of the columnar body 100 with the connecting slot 502 of the supporting part 5, and adjust the opening end of the vertical section 181 to align with the locking piece 542, and the columnar body 100 moves along its axis until the upper end of the locking piece 542 is against the corner of the vertical section 181 and the horizontal section 182, completing the insertion of the columnar body 100 on the connecting slot 502, at which time the columnar body 100 is in the first position, and the escape slot 26 corresponds exactly to the key 43, and the key 43 will be accommodated in the escape slot 26 when the pressing structure 200 is pressed in this state.

(b) The columnar body 100 rotates around its axis. The locking piece 542 moves on the horizontal section 182 until the positioning protruding point 5421 of the locking piece 542 is embedded in the positioning slot 183 of the horizontal section 182, completing the fixing of the columnar body 100 on the connection slot 502 by screwing, at which time the column body 100 is in the second position and the escape slot 26 is misaligned with the key 43. When the pressing structure 200 is pressed in this state, the key 43 may not be accommodated in the escape slot 26, so that the end of the pressing structure 200 may be pressed against the key 43 normally.

Of course, the above describes the columnar body 100 moving relative to the supporting part 5. Conversely, the supporting part 5 may also move relative to the columnar body 100, with a simple change depending on the object being applied force by the installer.

Referring to FIG. 6, it should be noted that, the same as the sofa switch of embodiment 1, the sofa switch of the present embodiment may also achieve: The components are removably connected to each other. Through the mutual cooperation of the elastic snap hook 22 with the mounting chamber 11 and the first protrusion 12, the pressing part 2 may be quickly and removably installed, which facilitates the assembly of the sofa switch, and prevents the pressing part 2 from loosening or detaching from the upper end of the mounting chamber 11 to cause the problem of poor contact, thereby improving the user experience.

That is, in the present embodiment, the same as in embodiment 1: the upper end of the columnar body 100 extends outwardly to form the extension 13A. When the sofa switch is mounted on the armrest of the sofa, the extension 13A will fit to the upper surface of the armrest of the sofa. In the present embodiment, the extension 13A is annular. The outer edge of the annular extension 13A protrudes upwardly to form the folded edge 13B. The key cap 3 covers the upper end of the mounting chamber 11 and also the above of the extension 13A. The extension 13A is integral with the folded edge 13B, collectively called the outer edge 13, which is shaped to form the accommodation chamber 131. The accommodation chamber 131 holds the key cap 3. The folded edge 13B surrounds the key cap 3 to protect the key cap 3 from being easily collided to detach from the pressing member 2 and to keep the switch flat.

The technical means disclosed in the solution of the present invention are not limited to the technical means disclosed in the above-mentioned embodiments, but also comprise technical solutions composed of any combination of the above technical features. It should be noted that for a person of ordinary skill in this technical field, a number of improvements and refinements may be made without departing from the principles of the present invention, and these improvements and refinements are also regarded as the scope of protection of the present invention.

The invention claimed is:

1. A sofa switch, characterized by comprising:

a columnar body, wherein an internal of the columnar body is provided with a mounting chamber penetrating upwards and downwards, an upper end of the columnar body extends outwardly to form an extension part;

a pressing structure, wherein the pressing structure comprises a pressing part and a key cap, the key cap covers over the extension part; and the pressing part comprises a pressing body and a plurality of elastic snap hooks extending upwardly at an oblique angle from the pressing body, an upper end of the mounting chamber is provided with a first protrusion to restrict the elastic snap hooks.

2. The sofa switch according to claim 1, characterized in that an outer side wall of the columnar body is provided with an external threads.

3. The sofa switch according to claim 1, characterized in that the sofa switch further comprises a key switch panel, wherein the key switch panel is installed in the mounting chamber and located below the pressing part, the pressing part is at least partially accommodated in the mounting chamber and is movable upwards and downwards in the mounting chamber to press or release the key switch panel.

4. The sofa switch according to claim 3, characterized in that the sofa switch further comprises a supporting part, an upper end of the mounting chamber is provided with a second protrusion, the supporting part extends into the mounting chamber from a lower end of the columnar body, a lower end of the supporting part is restricted by a lower edge of the mounting chamber, the key switch panel is clamped between the second protrusion and the supporting part.

5. The sofa switch according to claim 4, characterized in that the supporting part is provided with a slide slot extending vertically, wherein the mounting chamber is provided with a slider that fits into the slide slot.

6. The sofa switch according to claim 5, characterized in that the key switch panel is provided with a groove corresponding to a position of the slider, an upper end of the supporting part forms a third protrusion upwards, wherein the third protrusion fits into the groove.

7. The sofa switch according to claim 1, characterized in that an outer edge of the extension part is raised upwards to form a folded edge, wherein the folded edge encloses the key cap.

* * * * *